United States Patent
Ganesan et al.

(10) Patent No.: US 9,118,554 B2
(45) Date of Patent: Aug. 25, 2015

(54) SYSTEM AND METHOD FOR AUTOMATED DCB CONFIGURATION OF ACCESS SWITCHES

(71) Applicant: DELL PRODUCTS L.P., Round Rock, TX (US)

(72) Inventors: Senthil Kumar Ganesan, Fremont, CA (US); Raja Jayakumar, Fremont, CA (US); Ashok Daparthi, Andhra Pradesh (IN); Aravind Babu Mahendrababu, Tamilnadu (IN); Raja Subbiah, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 14/065,076

(22) Filed: Oct. 28, 2013

(65) Prior Publication Data
US 2015/0117252 A1    Apr. 30, 2015

(51) Int. Cl.
*H04L 12/28* (2006.01)
*H04L 12/24* (2006.01)

(52) U.S. Cl.
CPC .................................. *H04L 41/0813* (2013.01)

(58) Field of Classification Search
USPC ........................ 370/389, 401, 254, 252, 230
See application file for complete search history.

(56) References Cited

U.S. PATENT DOCUMENTS

2012/0106558 A1*  5/2012  Dickens et al. ............... 370/401
2014/0281045 A1*  9/2014  Chawla et al. .................... 710/6
2015/0026313 A1*  1/2015  Chawla et al. ................ 709/220

OTHER PUBLICATIONS

Dell Products, "Data Center Bridging: Standards, Behavioral Requirements, and Configuration Guidelines with Dell EqualLogic iSCSI SANs," A Dell EqualLogic Technical White Paper, http://en.community.dell.com/dell-groups/dtcmedia/m/mediagallery/20283700/download.aspx, Jan. 2013, 53 pages.

* cited by examiner

*Primary Examiner* — Duc C Ho
(74) *Attorney, Agent, or Firm* — Haynes and Boone, LLP

(57) ABSTRACT

A system and method of automated Data Center Bridging (DCB) configuration of an access switch includes a control unit, a memory, and a port configured to couple the access switch to a peer device. The control unit is configured to operate the port according to a state machine including a DCB disabled state, a DCB downstream state, and a DCB upstream state. When the port is in the DCB disabled state, the control unit exchanges network traffic on the port without any DCB extensions. When the port is in the DCB upstream state, the control unit exchanges network traffic on the port using DCB extensions based on the DCB configuration and receives the DCB configuration from the peer device. When the port is in the DCB downstream state, the control unit exchanges network traffic on the port using the DCB extensions and transmits the DCB configuration to the peer device.

20 Claims, 3 Drawing Sheets

SYSTEM AND METHOD FOR AUTOMATED DCB CONFIGURATION OF ACCESS SWITCHES

BACKGROUND

The present disclosure relates generally to information handling systems, and more particularly to automated Data Center Bridging (DCB) configuration of access switches.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that, when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often used to implement the interconnection fabric.

Information handling systems and data centers often include large numbers of networked devices including end stations, hosts, servers, network switching devices, and/or the like. The networked devices are typically coupled together using one or more local area networks (LANs). The LANs provide physical interconnectivity between the networked devices and provide one or more protocols for forwarding and/or exchanging network traffic between the networked devices. One of the more popular types of LAN is the Ethernet. The Ethernet includes a large family of protocols and standards for implementing physical interconnectivity, network access, and data link functionality. In the TCP/IP network model, Ethernet typically provides network functionality up through layer 2 of the network protocol stack.

In most cases, Ethernet provides a best efforts delivery model for network traffic. This means that networked devices using Ethernet make a best effort to deliver packets of network traffic to the desired destination, but no guarantee of delivery is provided. Changing network conditions such as network congestion, delay, and/or the like may result in the dropping of packets and thus the non-delivery of the affected packet. Some mechanisms, such as link-level flow control (LLFC), may provide some basic mechanisms for addressing congestion, but other layers in the network protocol stack, such as the layer 4 Transmission Control Protocol (TCP), have traditionally been used to provide guaranteed delivery mechanisms that ensure lossless delivery of network packets.

More recently, the Ethernet standard has been extended to provide better management and control of network traffic and network bandwidth at the layer 2 level. Several of these Ethernet extensions are included in a group of features often referred to as Data Center Bridging (DCB). DCB typically provides network resource sharing mechanisms that allow multiple types of network traffic to more effectively share network links between networked devices and to improve the likelihood of lossless delivery of network traffic. DCB includes mechanisms for priority flow control (PFC), bandwidth management, congestion notification, and other related mechanisms. PFC may provide the ability to create multiple queues for a network link with each queue being assigned a different priority. Bandwidth management may include Enhanced Transmission Selection (ETS) that allows the bandwidth of a network link to be divided among different groups and/or types of network traffic. Congestion notification allows a network switching device to notify the peer devices at the other end of each network link that it is congested and can no longer receive and/or handle additional network traffic.

In order to support DCB, the network devices using DCB should be consistently configured. Accordingly, it would be desirable to provide improved systems and methods for managing the configuration of network devices using DCB, including the automated DCB configuration of access switches.

SUMMARY

According to one embodiment, an access switch includes a control unit, a memory coupled to the control unit, and a port coupled to the control unit and configured to couple the access switch to a peer device. The control unit is configured to operate the port according to a state machine including a DCB disabled state, a DCB downstream state, and a DCB upstream state. When the port is in the DCB disabled state, the control unit is configured to exchange network traffic on the port without any DCB extensions. When the port is in the DCB upstream state, the control unit is configured to exchange network traffic on the port using DCB extensions based on a DCB configuration and receive the DCB configuration from the peer device. When the port is in the DCB downstream state, the control unit is configured to exchange network traffic on the port using the DCB extensions based on the DCB configuration and transmit the DCB configuration to the peer device.

According to another embodiment, a method of managing a data center bridging (DCB) configuration of a port of an access switch includes setting the port to a DCB disabled state, receiving a first network packet on the port, and examining the first network packet. When the port is in the DCB disabled state, the method further includes exchanging one or more second network packets with a peer device coupled to the port without any DCB extensions and transitioning the port to a DCB downstream state when the first network packet includes a first DCB packet. When the port is in the DCB downstream state, the method further includes exchanging one or more third network packets with the peer device using DCB extensions based on the DCB configuration, transmitting the DCB configuration to the peer device, and transitioning the port to a DCB upstream state when one of the third network packets includes a first peer configuration packet indicating that the peer device is an upstream device selected from a group consisting of a switch, a router, and a repeater. When the port is in the DCB upstream state, the method further includes exchanging one or more fourth network packets with the peer device using the DCB extensions based on the DCB configuration, receiving the DCB configuration from the peer device, and transitioning the port to a DCB downstream state when one of the fourth network packet includes a second peer configuration packet indicating that the peer device is an end station.

According to yet another embodiment, an information handling system includes an access switch, a first state machine, and a second state machine. The access switch includes one or more processors, a memory coupled to the one or more processers, a first network port coupled to the one or more processors and configured to couple the network switching device to an upstream device, and a second network port coupled to the one or more processors and configured to couple the network switching device to an end station. The first state machine is associated with the first port. The second state machine is associated with the second port. The one or more processors are configured to set the first state machine to a DCB disabled state, receive a first message on the first port, transition the first state machine to a DCB enabled downstream state based on receipt of the first message, receive a second message on the first port, transition the first state machine to a DCB enabled upstream state based on receipt of the second message, receive a DCB configuration from the upstream device while the first state machine is in the DCB enabled upstream state, exchange one or more third messages on the first port using DCB extensions based on the DCB configuration while the first state machine is in the DCB enabled upstream state, set the second state machine to the DCB disabled state, receive a fourth message on the second port, transition the second state machine to the DCB enabled downstream state based on receipt of the fourth message, transmit the DCB configuration to the end station while the second state machine is in the DCB enabled downstream state, and exchange one or more fifth messages on the second port using the DCB extensions based on the DCB configuration while the second state machine is in the DCB enabled downstream state. The first message includes a first DCB packet. The second message includes a peer configuration packet indicating that the upstream device is selected from a group consisting of a switch, a router, and a repeater. The fourth message includes a second DCB packet.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
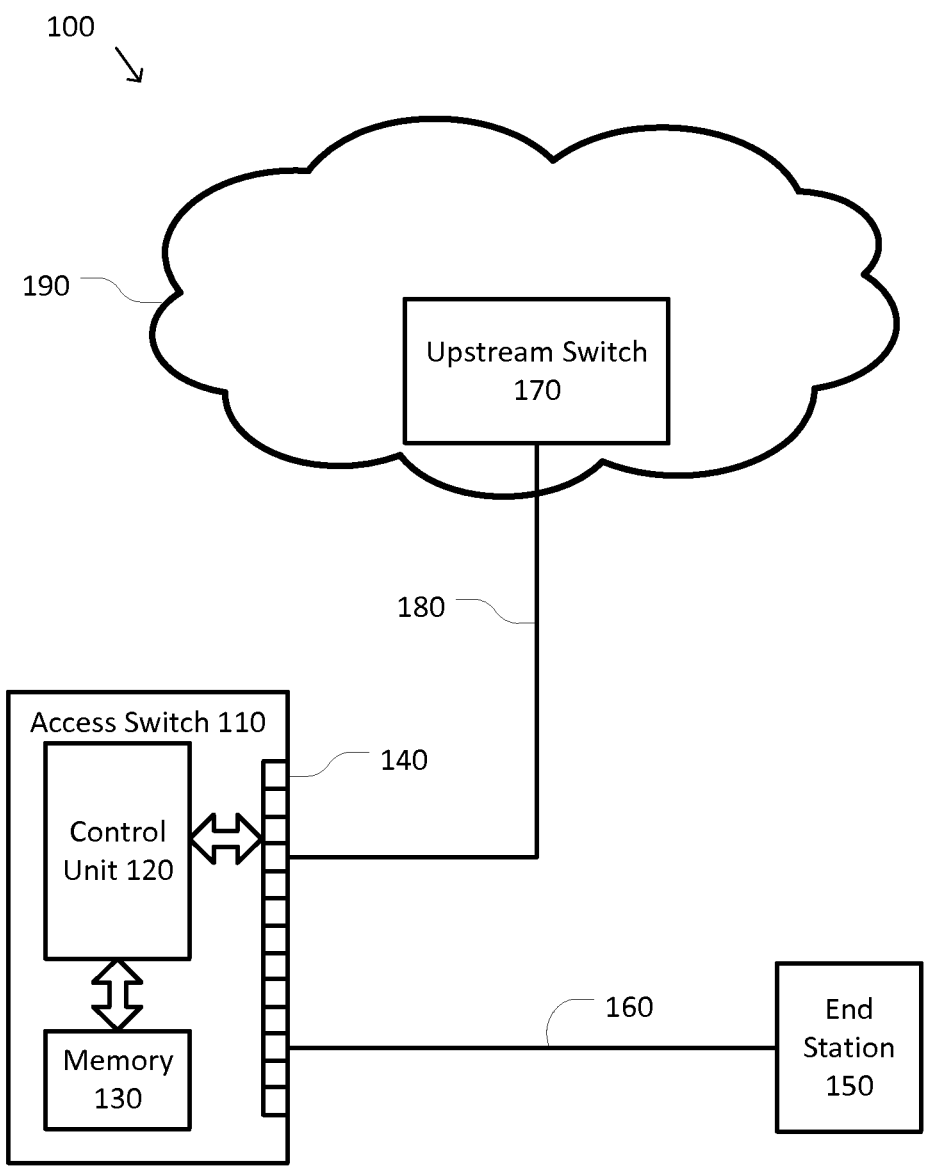
FIG. 1 is a simplified diagram of a network according to some embodiments.

FIG. 1 is a simplified diagram of a network 100 according to some embodiments. As shown in FIG. 1, network 100 includes several networked devices including an access switch 110, an end station 150, and an upstream switch 170. And although FIG. 1 shows only one access switch 110, one end station 150, and one upstream switch 170 in network 100, it is understood that network 100 may include any number of end stations, access switches, and upstream switches. Network 100 may further include other networked devices such as routers, repeaters, bridges, and/or the like.

Access switch 110 includes a control unit 120 and memory 130. Control unit 120 is coupled to memory 130 and may control the operation of access switch 110. In some examples, control unit 120 may be used to make forwarding decisions for network traffic being handled by switch 110. In some examples, control unit 120 may include one or more processors that may be any type of central processing unit, microprocessor, microcontroller, multi-core processor, and/or the like. Switch 110 further includes one or more network ports 140 coupled to control unit 120 and configured to couple access switch 110 to other networked devices, such as other switches, end stations, and/or the like, using network links Control unit 120 may use one or more protocols to communicate with the other networked devices using the network ports 140 and network links. As shown in FIG. 1, one of the network ports 140 of access switch 110 is coupled to a network port of end station 150 using network link 160. Another of the network ports 140 is coupled to a network port of upstream switch 170 using network link 180. Although not shown in FIG. 1, other of the one or more network ports 140 may be used to further couple access switch 110 to additional end stations, switches, and networked devices. In some examples, access switch 110 may also be referred to as a leaf switch and/or an end switch because access switch 110 provides access to network 100 for end station 150.

Although not expressly shown in FIG. 1, end station 150 and/or upstream switch 170 may each include a control unit-based and/or processor-based structure similar to access switch 110. In some examples, this includes a control unit coupled to memory and one or more network ports that allow end station 150 and/or upstream switch 170 to be receive, transmit, and process network traffic.

The arrangement of FIG. 1 is illustrative of but one possible arrangement among access switch 110, end station 150, and upstream switch 170. For example, upstream switch 170 is shown as being part of an upstream network 190. In some examples, upstream network 190 may include any number of networked devices, such as switches, including switches and/or routers that couple upstream network 190 to other networks. In some examples, access switch 110 may also be an upstream switch for other switches in network 100. In some examples, upstream switch 170 may be an access switch for other end stations in network 100. In some examples, end station 150 may be any kind of networked device from which network traffic may originate or terminate, including a server, a host, a PC, an end user device, and/or the like.

As discussed above and further emphasized here, FIG. 1 is merely an example which should not unduly limit the scope of the claims. One of ordinary skill in the art would recognize many variations, alternatives, and modifications. In some embodiments, network 100 may include parallelization not expressly shown in FIG. 1. In some examples, the connections between access switch 110 and end station 150 and/or between access switch 110 and upstream switch 170 may include multiple parallel network links. In some examples, the multiple parallel network links may be associated with corresponding link aggregation groups (LAGs). In some examples, access switch 110 and/or upstream switch 170 may be implemented using virtual link trunking (VLT) pairs, stacked switches, and/or other multi-switch arrangements with shared management.

Provisioning and/or configuration of the network ports using network links 160 and/or 180 of network 100 is generally performed before the extended features of DCB may be used on network links 160 and/or 180. This provisioning and/or configuration may include several DCB parameters and/or settings including those that determine the number of priority groups or traffic classes supported on the network links 160 and/or 180, the bandwidth allocations for each of the priority groups and/or traffic classes, and/or other related parameters. In some examples, because network traffic is often forwarded by switches from one network link to another, general agreement on DCB parameters across each of the network links in a LAN is often required so that there is at least consistency in the number priority groups and/or traffic classes from network link to network link. In some examples, this agreement may provide a consistent set of priority groups and/or traffic classes across all of the access switches, upstream switches, and/or end stations in the corresponding LAN.

In some embodiments, provisioning and/or configuration of the DCB parameters for network links 160 and/or 180 may be handled manually. A network administrator may manually provision the DCB configuration for the network links by manually provisioning the DCB configuration in each port at both ends of each of the network links. In the examples of FIG. 1, this would include provisioning both the network port in end station 150 and the network port 140 in access switch 110 with the DCB configuration for network link 160. Similar provisioning of the DCB configuration would occur for network link 180 by provisioning both the network port in upstream switch 170 and the network port 140 in access switch 110. Once manually provisioned, end station 150 and access switch 110 as well as upstream switch 170 and access switch 110 may exchange informational messages that include the parameters of the DCB configuration using a management protocol, such as the Link Layer Discovery Protocol (LLDP) of the IEEE 802.1 family of standards In some examples, these informational messages may allow both networked devices at the end of each network link to confirm agreement on the parameters of the DCB configuration for the network link. In some examples, manual provisioning and/or configuration of the DCB configuration may also be used when not all the networked devices are able to handle DCB mechanisms so that DCB may be enabled and/or disabled on different network ports of a networked device.

In some embodiments, provisioning and/or configuration of the DCB configuration for network links 160 and/or 180 may be propagated across network 100. In some examples, each of the network ports in the access switches, upstream switches, and/or end stations may be provisioned (e.g., manually) to indicate whether the respective network port is willing to receive parameters of the DCB configuration from the peer device at the other end of the network link they share. In some examples, informational messages that include the DCB configuration may be exchanged to both receive and/or confirm the DCB configuration to use for the network link. In some examples, in order to use the DCB propagation mechanisms, a network administrator may manually provision each of the network ports with the willingness of the respective network port to receive its DCB configuration from its peer device. In some examples, the manual provisioning may create a pattern of propagation that allows the DCB configuration to propagate to each of the networked devices.

In some embodiments, reliance on manual provisioning may increase the expense and/or downtime when switches, such as access switches, are replaced and/or rebooted in a network. In some examples, when the DCB propagation mechanisms are used, the network port numbering between a new and a replaced access switch may remain the same and/or the changes in port numbering may be noted, otherwise the arrangement of willing network ports may no longer provide complete propagation of the DCB configuration.

Accordingly, it would be advantageous to provide extensions to the DCB propagation mechanisms to address some of these limitations. In some examples, the extensions may include the automated ability to determine whether DCB is to be enabled for each individual network port on an access device. In some examples, the extensions may include the automated ability to determine whether the network port may receive its DCB configuration as propagated from the peer device and/or whether the network port may propagate its DCB configuration to its peer device.

Figure 2:
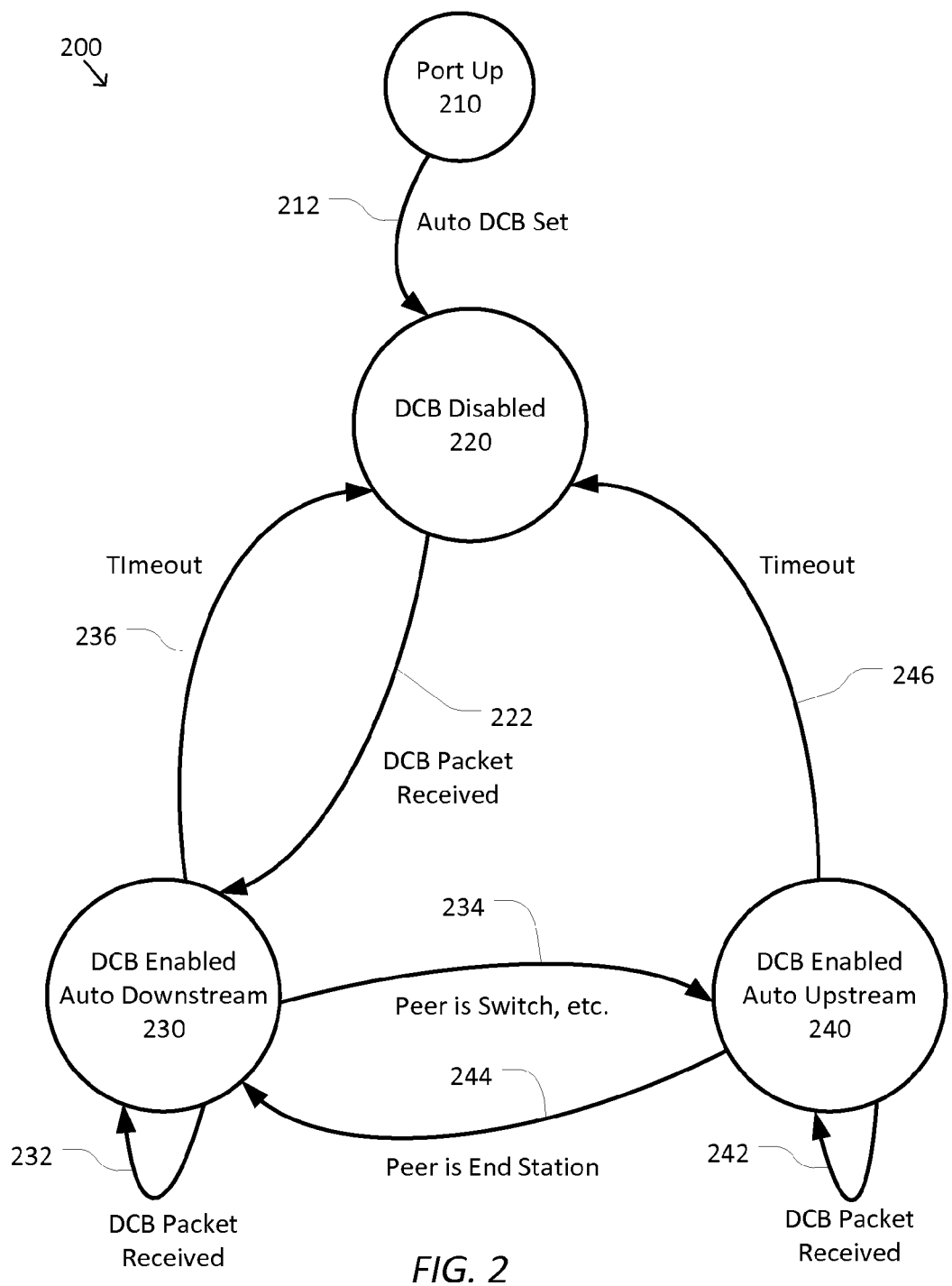
FIG. 2 is a simplified diagram of a DCB state machine for a network port according to some embodiments.

FIG. 2 is a simplified diagram of a DCB state machine 200 for a network port according to some embodiments. As shown in FIG. 2, the DCB state machine 200 includes four possible states for the network port. The four possible states include a Port Up state 210, a DCB Disabled state 220, a DCB Enabled Auto Downstream state 230, and a DCB Enabled Auto Upstream state 240. In some examples, each of the network ports on a switch may include its own version of the DCB state machine 200. In some examples, each of the network ports on a switch may assume any of the states 210, 220, 230, and/or 240 independent of the other network ports. In some examples, each of the network ports of the switch may include other states not shown in FIG. 2. In some examples, the network port may be any of the network ports 140 in access switch 110.

In the Port Up state 210, the network port is up and operational and may be used to transmit and/or receive network packets with a peer device on the network link coupled to the network port. In some examples, the peer device may be an end station, an upstream switch, and/or another networked device. In some examples, Auto DCB may be set to allow the network port to automatically manage DCB configuration for itself based on network packets received on the network port. When Auto DCB is set for the network port, the network port may transition to the DCB Disabled state 220 as depicted by a state transition 212. In some examples, Auto DCB may be set when the network port is provisioned. In some examples, Auto DCB may be set by default for the network port. In some examples, Auto DCB may be set for each port individually and/or across all network ports of the switch.

In the DCB Disabled state 220, the network port may transmit and/or receive network packets with the peer device without using any of the Ethernet extensions provided by DCB. In some examples, the network port may use other features of Ethernet such as address learning, link-level flow control, and/or the like. In addition to transmitting and/or receiving network packets, the network port may additionally examine each received network packet, frame, and/or message to determine whether the peer device is using and/or desires to use DCB. In some examples, the peer device may indicate its use of DCB by transmitting one or more DCB packets on the network link where they are received at the network port on the access switch. When a DCB packet is received on the network port, the network port transitions to the DCB Enabled Auto Downstream state 230 as depicted by a state transition 222.

According to some embodiments, several extensions to the IEEE 802.1 Ethernet standard include type-length-value (TLV) fields that are associated with DCB. In some examples, the extensions may include any of the extensions of Data Center Bridging eXchange (DCBX) of IEEE 802.1Qaz, Enhanced Transmission Selection (ETS) of IEEE 802.1Qaz, Priority-based Flow Control (PFC) of IEEE 802.1Qbb, Converged/Convergence Enhanced Ethernet (CEE), Data Center Ethernet (DCE), Cisco-Intel-Nuova DCBX (CIN), and/or the like. The DCB TLVs of these extensions may be embedded into Link Layer Discovery Protocol (LLDP) Protocol Data Units (PDUs) that are periodically exchanged between network ports of networked devices. In some examples, the reception of any of these DCB TLVs may be sufficient to trigger the state transition 232. In some examples, the DCB TLVs may include any of the following TLVs: a DCBX Control TLV of CIN or CEE; an ETS Configuration TLV; an ETS Priority Group TLV of CIN or CEE; an ETS Recommendation TLV; a Priority-based Flow Control TLV in baseline or IEEE form; a Congestion Notification TLV; an Application TLV of CIN, CEE, or IEEE; and/or the like.

In the DCB Enabled Auto Downstream or DCB Downstream state 230, the network port may continue to transmit and/or receive network packets with the peer device, but may now do so using the DCB extensions for the network port. The network port may further assume that it is part of a networked device that is upstream of an end station, such as end station 150. This means that the network port may propagate its DCB configuration, using one or more of the DCB packets, downstream to the end station so that the end station may match the DCB configuration to those of the access switch. In some examples, the network port may use the DCB configuration that applies to the access switch as a whole. In some examples, the DCB configuration may be received by the access switch at a network port that is in the DCB Enabled Auto Upstream state 240, as is discussed further below. In some examples, the DCB configuration may be received as part of the provisioning for the access switch and/or the network port. In some examples, the network port may start a timer when it enters the DCB Enabled Auto Downstream state 230.

While in the DCB Enabled Auto Downstream state 230, the network port may continue to receive DCB packets. In some examples, the DCB packets may be exchanged with the peer device as part of the periodic exchange and/or confirmation of the DCB configuration with the peer device. In some examples, the DCB packets may be included in a LLDP PDU received on the network port. In some examples, each time the network port receives a DCB packet, it may start and/or restart the timer. With each DCB packet received, the network port remains in the DCB Enabled Auto Downstream state 230 as depicted by a state transition 232.

While in the DCB Enabled Auto Downstream state 230, the network port may determine that the peer device is an upstream device, such as an upstream switch like upstream switch 170, a router, a repeater, and/or the like, rather than a downstream device, such as end station like end station 150. In some examples, the network port may determine that the peer device is an upstream device by receiving a peer configuration packet, such as a System Capability TLV, from the peer device. In some examples, the System Capability TLV may be included in a LLDP PDU received on the network port. In some examples, the peer device may indicate that it is an upstream device by setting any of the repeater, switch, and/or router bits in the System Capability TLV. When the network port determines that the peer device is an upstream device, the network port moves to the DCB Enabled Auto Upstream state 240 as depicted by a state transition 234.

When the timer times-out while the network port is in the DCB Enabled Auto Downstream state 230, the network port may assume that DCB is no longer active on the network port and the corresponding network link. As a result, the network port may change its state to the DCB Disabled state 220 as depicted by a state transition 236. As a result of the transition to the DCB Disabled state 220, the network port may begin waiting for DCB packets to be received before resuming the transmitting and/or receiving of network packets using DCB extensions.

In the DCB Enabled Auto Upstream or DCB Upstream state 240, the network port may continue to transmit and/or receive network packets with the peer device using the DCB extensions for the network port. The network port may further assume that it is part of a networked device that is downstream of an upstream switch, such as upstream switch 170. This means that the network port may receive its DCB configuration as propagated to it from the upstream switch. The DCB configuration may be received in one or more of the DCB packets received from the upstream device. In some examples, the network port may additionally share the DCB configuration with other network ports on the access switch so that the other network ports may use the same DCB configuration and/or propagate the DCB configuration to downstream networked devices. In some examples, the other network ports with which the DCB configuration is shared may be in the DCB Enabled Auto Downstream state 230. In some examples, when the access switch includes more than one network port in the DCB Enabled Auto Upstream state 240, a priority mechanism may be used to determine which network port's DCB configuration is to be shared with the other network ports. In some examples, the network port may start and/or restart the timer when it enters the DCB Enabled Auto Upstream state 240.

While in the DCB Enabled Auto Upstream state 240, the network port may continue to receive DCB packets. In some examples, the DCB packets may be exchanged with the upstream device as part of the periodic exchange and/or confirmation of the DCB configuration with the upstream device. In some examples, the DCB packets may be included in a LLDP PDU received on the network port. In some examples, each time the network port receives a DCB packet, it may start and/or restart the timer. With each DCB packet received, the network port remains in the DCB Enabled Auto Upstream state 240 as depicted by the state transition 242.

While in the DCB Enabled Auto Upstream state 240, the network port may determine that the peer device is a downstream device such as end station 150. In some examples, the network port may determine that the peer device is a downstream device by receiving a peer configuration packet, such as a System Capability TLV, from the peer device. In some examples, the System Capability TLV may be included in a LLDP PDU received on the network port. In some examples, the peer device may indicate that it is a downstream device by setting the end station bit in the System Capability TLV. When the network port determines that the peer device is a downstream device, the network port moves to the DCB Enabled Auto Downstream state 230 as depicted by a state transition 244.

When the timer times-out while the network port is in the DCB Enabled Auto Upstream state 240, the network port may assume that DCB is no longer active on the network port and the corresponding network link. As a result, the network port may change its state to the DCB Disabled state 220 as depicted by a state transition 246. As a result of the transition to the DCB Disabled state 220, the network port may begin waiting for DCB packets to be received before resuming the transmitting and/or receiving of network packets using DCB extensions.

Figure 3:
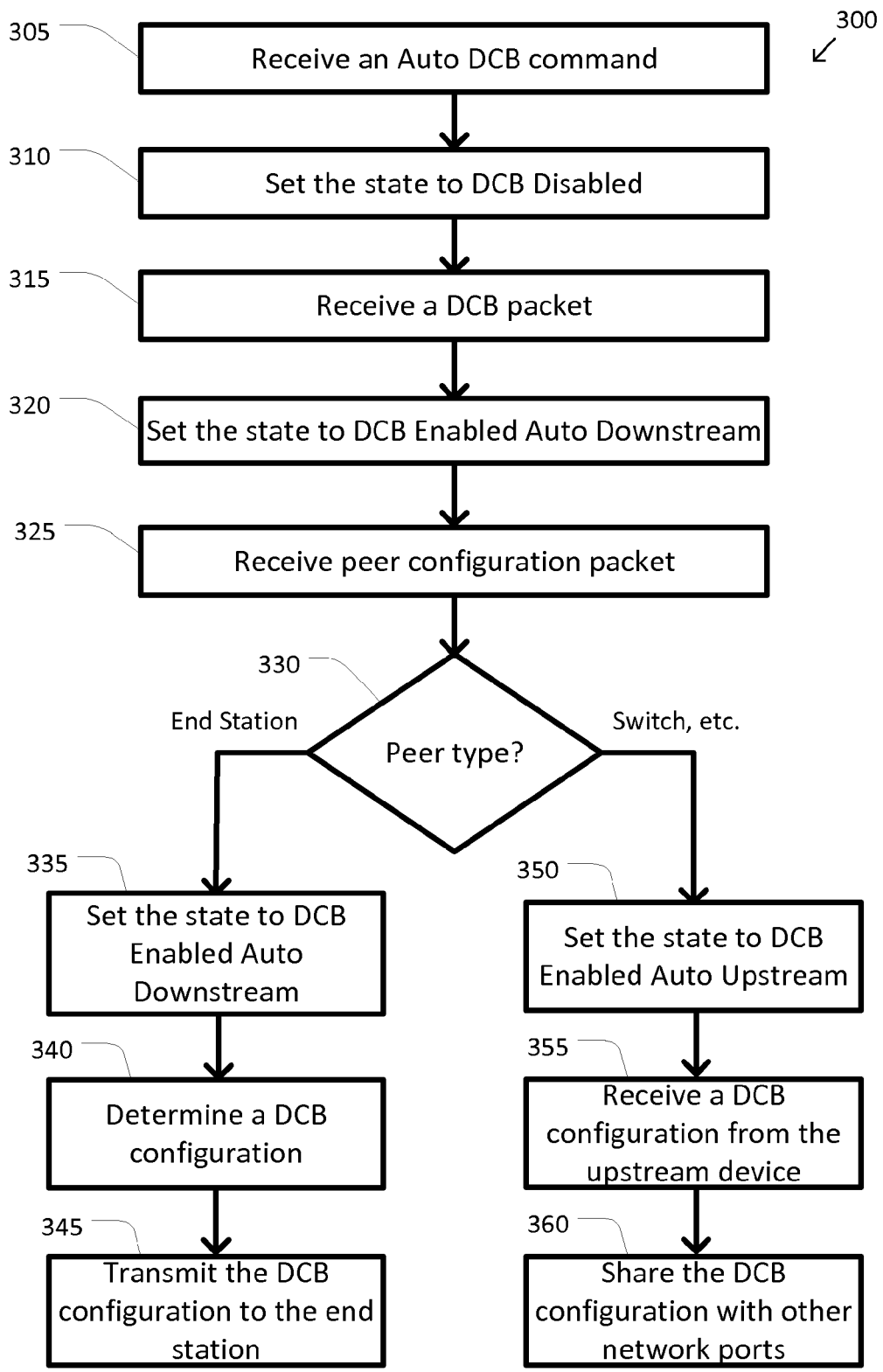
FIG. 3 is a simplified diagram of a method of DCB state management of a network port according to some embodiments.

FIG. 3 is a simplified diagram of a method 300 of DCB state management of a network port according to some embodiments. In some embodiments, one or more of the processes 305-360 of method 300 may be implemented, at least in part, in the form of executable code stored on non-transient, tangible, machine readable media that when run by one or more processors (e.g., the one or more processors of control unit 120) may cause the one or more processors to perform one or more of the processes 305-360. In some embodiments, method 300 may be performed in an access switch, such as the access switch 110 for each of the one or more ports, such as network ports 140, on the access switch.

At an optional process 305, an Auto DCB command may be received. In some examples, once a network port is up and operational, it may enter the Port Up state 210 by default. In some examples, once in the Port Up state 210, the network port may receive a provisioning and/or configuration command directing the network port to activate automatic DCB configuration for the network port based on network packets and/or messages receive on the network port. In some examples, the provisioning and/or configuration command may come from a network administrator. In some examples, the provisioning and/or configuration command may be received via a provisioning instruction, a provisioning interface, and/or an application programming interface (API) call. In some examples, process 305 may be omitted when the DCB disabled state 220 is the default state for the network port once it enters the Port Up state 210. In some examples, the receipt of the Auto DCB command may correspond to the state transition 212.

At a process 310, the state of the network port is set to the DCB Disabled state 220. Once in the DCB Disabled state 220, the network port may transmit and/or receive network packets with a peer device without using DCB extensions. The network port may also monitor each received network packet, frame, and/or message to determine whether it includes a DCB packet.

At a process 315, a DCB packet is received. As the network port monitors each of the received network packets, frames, and/or messages from the peer device, it may examine each of them to determine whether those network packets, frames, and/or messages include a DCB packet. In some examples, the DCB packet may be a DCB TLV embedded in a LLDP PDU received on the network port. In some examples, the DCB TLV may be any of the following TLVs: a DCBX Control TLV of CIN or CEE; an ETS Configuration TLV; an ETS Priority Group TLV of CIN or CEE; an ETS Recommendation TLV; a Priority-based Flow Control TLV in baseline or IEEE form; a Congestion Notification TLV; an Application TLV of CIN, CEE, or IEEE; and/or the like. In some examples, the DCB TLVs may be included in a LLDP PDU received on the network port. In some examples, the receipt of the DCB packet during process 315 may correspond to the state transition 222.

At a process 320, the state of the network port is set to the DCB Enabled Auto Downstream state 230. When a DCB packet is received on the network port during the process 315, this indicates that the peer device coupled to the network port is configured for use of DCB extensions. When the network port enters the DCB Enabled Auto Downstream state 230, the network port may begin exchanging network packets, frames, and/or messages with the peer device using DCB extensions. In some examples, after changing the state to the DCB Enabled Auto Downstream state 230, the network port may start and/or restart a timer.

At a process 325, a peer configuration packet may be received. The peer configuration packet may indicate a type of the peer device. In some examples, the peer configuration packet may be a System Capability TLV. In some examples, the System Capability TLV may be included in a LLDP PDU received on the network port. In some examples, the peer device may indicate that it is an upstream device by setting any of the repeater, switch, and/or router bits in the System Capability TLV. In some examples, the peer device may indicate that it is an end station device by setting the end station bit in the System Capability TLV. In some examples, receipt of the peer configuration packet during process 325 may correspond to either of the state transitions 234 and/or 244.

At a process 330, a type of the peer device is determined. In some examples, the type of the peer device may be determined by examining whether the switch, router, repeater, and/or end station bits are set in the System Capability TLV received during process 325. When the network port determines that the peer device is a downstream device, such as an end station, the state of the network device is set to the DCB Enabled Auto Downstream state 230 using a process 335. When the network port determines that the peer device is an upstream device, such as a switch, router, and/or repeater, the state of the network device is set to the DCB Enabled Auto Upstream state 240 using a process 350.

At the process 335, the state of the network port is set to the DCB Enabled Auto Downstream state 230. When the peer device is an end station, the network port may begin the process of propagating its DCB configuration with the end station by changing its state to the DCB Enabled Auto Downstream state 230. When the network port enters the DCB Enabled Auto Downstream state 230, the network port may begin and/or continue exchanging network packets, frames, and/or messages with the peer device using DCB extensions. In some examples, after changing the state to the DCB Enabled Auto Downstream state 230, the network port may start and/or restart the timer.

At a process 340, a DCB configuration for the network port may be determined. In some examples, the network port may determine the DCB configuration by using the DCB configuration that applies to the access switch as a whole. In some examples, the DCB configuration may be received from another port on the access switch. In some examples, the DCB configuration may be received as part of the provisioning for the access switch and/or the network port.

At a process 345, the DCB configuration is transmitted to the end station. The DCB configuration determined during process 340 may be transmitted to the end station. In some examples, the DCB configuration may be transmitted to the end station using one or more DCB packets. In some examples, the end station may confirm the DCB configuration by returning one or more DCB packets. In some examples, the network port may continue to periodically exchange DCB packets with the end station after the completion of process 345.

At the process 350, the state of the network port is set to the DCB Enabled Auto Upstream state 240. When the peer device is an upstream switch, router, repeater, and/or the like, the network port may begin the process of receiving a propagated DCB configuration from the upstream device by changing its state to the DCB Enabled Auto Upstream state 240. When the network port enters the DCB Enabled Auto Upstream state 240, the network port may begin and/or continue exchanging network packets, frames, and/or messages with the peer device using DCB extensions. In some examples, after changing the state to the DCB Enabled Auto Upstream state 240, the network port may start and/or restart the timer.

At a process 355, a DCB configuration is received from the upstream device. The DCB configuration may be received in one or more DCB packets received from the upstream device. In some examples, the network port may confirm the received DCB configuration by returning one or more DCB packets to the upstream device. In some examples, the network port may continue to periodically exchange DCB packets with the upstream device after the completion of process 355.

At a process 360, the DCB configuration is shared with other network ports. After receiving the DCB configuration from the upstream device during process 355, the network port may share the DCB configuration with other network ports on the access switch so that the other network ports may use the same DCB configuration and/or propagate the DCB configuration to downstream networked devices. In some examples, the shared DCB configuration may be the DCB configuration determined by the other network ports during their corresponding process 340. In some examples, when the access switch includes more than one network port attempting to share its DCB configuration using a corresponding process 360, a priority mechanism may be used to determine which network port's DCB configuration is to be shared with the other network ports.

After the network port completes processes 345 and/or 360, the network port may repeat one or more of the processes 310-360 according to many possible variations, alternatives, and modification as would be understood by one of ordinary skill in the art. In some embodiments, when the network port enters the DCB Enabled Auto Downstream state 230 from the DCB Disabled state 220 using process 320, the processes 325, 330, and 335 may be skipped with the method proceeding straight to process 340 without first receiving a peer configuration packet. In some embodiments, when the timer started in process 320, 335, and/or 350 times out, the network port may set the state back to the DCB Disabled state 220 by returning to process 310. In some examples, the transition back to the DCB Disabled state 220 may correspond with either of the state transitions 236 and/or 246. In some embodiments, another peer configuration packet may be received on the network port using the process 325 potentially changing the state of the network port. In some examples, the receipt of the another peer configuration packet may correspond to either of the state transitions 234 and/or 244. In some embodiments, an updated and/or changed DCB configuration may be determined during process 340 that may also be shared with the end station using process 345. In some embodiments, an updated and/or changed DCB configuration may be received during process 355 that may be shared with the other ports using process 360. In some embodiments, whenever a DCB packet is received on the network port, the timer started and/or restarted during process 320, 335, and/or 350 may be restarted to begin a new timeout period. In some examples, the receipt of the another DCB packet may correspond to either of the state transitions 232 and/or 242.

Some embodiments of the access switch 110 may include non-transient, tangible, machine readable media that include executable code that when run by one or more processors may cause the one or more processors (e.g., the one or more processors of control unit 120) to implement the state machine 200 and/or perform the processes of method 300 as described above. Some common forms of machine readable media that may include the implementation of state machine 200 and/or the processes of method 300 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. An access switch comprising:
   a control unit;
   a memory coupled to the control unit; and
   a port coupled to the control unit and configured to couple the access switch to a peer device;
   wherein:
      the control unit is configured to operate the port according to a state machine including a data center bridging (DCB) disabled state, a DCB downstream state, and a DCB upstream state;
      when the port is in the DCB disabled state, the control unit is configured to exchange network traffic on the port without any DCB extensions;

when the port is in the DCB upstream state, the control unit is configured to exchange network traffic on the port using DCB extensions based on a DCB configuration and receive the DCB configuration from the peer device; and when the port is in the DCB downstream state, the control unit is configured to exchange network traffic on the port using the DCB extensions based on the DCB configuration and transmit the DCB configuration to the peer device.

2. The access switch of claim 1 wherein when the port is in the DCB disabled state, the control unit is further configured to transition the port to the DCB downstream state when a DCB packet is received on the port.

3. The access switch of claim 2 wherein the DCB packet is a DCB type-length-value (TLV).

4. The access switch of claim 3 wherein the DCB TLV is selected from a group consisting of a Data Center Bridging eXchange (DCBX) Control TLV, an Enhanced Transmission Selection (ETS) Configuration TLV, an ETS Priority Group TLV, an ETS Recommendation TLV, a Priority-based Flow Control TLV, a Congestion Notification TLV, and an Application TLV.

5. The access switch of claim 3 wherein the DCB TLV is included in a Link Layer Discovery Protocol (LLDP) protocol data unit (PDU).

6. The access switch of claim 1 wherein the control unit is further configured to restart a timer whenever a DCB packet is received on the port.

7. The access switch of claim 6 wherein when the port is in either the DCB downstream state or the DCB upstream state, the control unit is further configured to transition the port to the DCB disabled state when the timer times out.

8. The access switch of claim 1 wherein when the port is in the DCB downstream state, the control unit is further configured to keep the port in the DCB downstream state when a DCB packet is received on the port.

9. The access switch of claim 1 wherein when the port is in the DCB upstream state, the control unit is further configured to keep the port in the DCB upstream state when a DCB packet is received on the port.

10. The access switch of claim 1 wherein when the port is in the DCB downstream state, the control unit is further configured to transition the port to the DCB upstream state when a peer configuration packet is received on the port indicating that the peer device is an upstream device selected from a group consisting of a switch, a router, and a repeater.

11. The access switch of claim 10 wherein the peer configuration packet is a System Capability TLV included in a LLDP PDU.

12. The access switch of claim 1 wherein when the port is in the DCB upstream state, the control unit is further configured to transition the port to the DCB downstream state when a peer configuration packet is received on the port indicating that the peer device is an end station.

13. The access switch of claim 1 wherein:
the state machine further includes a port up state; and
when the port is in the port up state, the control unit is further configured to transition the port to the DCB disabled state when an Auto DCB command is received for the port.

14. The access switch of claim 1 wherein when the port is in the DCB upstream state, the control unit is further configured to share the DCB configuration received from the peer device with other ports of the access switch.

15. The access switch of claim 1 wherein when the port is in the DCB downstream state, the control unit is further configured to receive the DCB configuration from another port of the access switch.

16. The access switch of claim 1 wherein when the port is in the DCB upstream state, the control unit is further configured to confirm the DCB configuration received from the peer device by transmitting one or more DCB packets to the peer device.

17. A method of managing a data center bridging (DCB) configuration of a port of an access switch, the method comprising:
setting the port to a DCB disabled state;
receiving a first network packet on the port;
examining the first network packet;
when the port is in the DCB disabled state:
exchanging one or more second network packets with a peer device coupled to the port without any DCB extensions; and
transitioning the port to a DCB downstream state when the first network packet includes a first DCB packet;
when the port is in the DCB downstream state:
exchanging one or more third network packets with the peer device using DCB extensions based on the DCB configuration;
transmitting the DCB configuration to the peer device; and
transitioning the port to a DCB upstream state when one of the third network packets includes a first peer configuration packet indicating that the peer device is an upstream device selected from a group consisting of a switch, a router, and a repeater;
when the port is in the DCB upstream state:
exchanging one or more fourth network packets with the peer device using the DCB extensions based on the DCB configuration;
receiving the DCB configuration from the peer device; and
transitioning the port to a DCB downstream state when one of the fourth network packet includes a second peer configuration packet indicating that the peer device is an end station.

18. The method of claim 17, further comprising:
starting a timer when the first network packet includes the first DCB packet; and
restarting the timer when one of the second, third, or fourth network packets includes a second DCB packet.

19. The method of claim 18, further comprising transitioning the port to the DCB disabled state when the timer times out.

20. An information handling system comprising:
an access switch comprising one or more processors, a memory coupled to the one or more processers, a first network port coupled to the one or more processors and configured to couple the access switch to an upstream device, and a second network port coupled to the one or more processors and configured to couple the access switch to an end station;
a first state machine associated with the first port; and
a second state machine associated with the second port;
wherein the one or more processors are configured to:
set the first state machine to a DCB disabled state;
receive a first message on the first port, the first message including a first data center bridging (DCB) packet;
transition the first state machine to a DCB enabled downstream state based on receipt of the first message;

receive a second message on the first port, the second message including a peer configuration packet indicating that the upstream device is selected from a group consisting of a switch, a router, and a repeater;

transition the first state machine to a DCB enabled upstream state based on receipt of the second message;

receive a DCB configuration from the upstream device while the first state machine is in the DCB enabled upstream state;

exchange one or more third messages on the first port using DCB extensions based on the DCB configuration while the first state machine is in the DCB enabled upstream state;

set the second state machine to the DCB disabled state;

receive a fourth message on the second port, the fourth message including a second DCB packet;

transition the second state machine to the DCB enabled downstream state based on receipt of the fourth message;

transmit the DCB configuration to the end station while the second state machine is in the DCB enabled downstream state; and exchange one or more fifth messages on the second port using the DCB extensions based on the DCB configuration while the second state machine is in the DCB enabled downstream state.

\* \* \* \* \*